United States Patent [19]
Sherwood

[11] Patent Number: 5,227,173
[45] Date of Patent: Jul. 13, 1993

[54] STAKING APPARATUS

[76] Inventor: Robert D. Sherwood, N87 W15714 Kenwood Blvd., Menomonee Falls, Wis. 53051

[21] Appl. No.: 737,342

[22] Filed: Jul. 29, 1991

[51] Int. Cl.⁵ .................. B29C 35/16; B29C 43/52
[52] U.S. Cl. ..................... 425/143; 29/243.5; 156/311; 264/249; 425/160; 425/384; 425/407
[58] Field of Search ............... 29/243.5, 509; 156/311, 156/498, 583.1; 264/249; 219/201, 221, 243; 425/112, 143, 160, 508, 509, 517, 518, 384, 407

[56] References Cited

U.S. PATENT DOCUMENTS

| 2,705,346 | 4/1955 | Schlabach et al. | 264/249 |
| 3,419,297 | 12/1968 | Diepenhorst et al. | 264/249 |
| 3,496,049 | 2/1970 | Anderson | 156/311 |
| 3,533,352 | 10/1970 | Miller | 156/311 |
| 3,900,714 | 8/1975 | Beyer | 264/249 |
| 4,455,134 | 6/1984 | Biggs | 425/508 |
| 4,633,559 | 1/1987 | Loren | 264/249 |
| 4,767,298 | 8/1988 | Bocchicchio et al. | 264/249 |
| 5,018,957 | 5/1991 | Assink et al. | 425/112 |

Primary Examiner—Scott Bushey
Attorney, Agent, or Firm—Whyte & Hirschboeck

[57] ABSTRACT

An apparatus for heat staking a first component to an apertured second component to form a unitary assembly are featured. A heated staking head from which one or more heat staking anvils extend laterally and are arranged at their respective distal ends to head over a protruding portion of a shank member formed in the first component to secure the shank to the second component, and which apparatus further includes an apertured cooling tube or tubes located in the proximity of the free end of respective anvils and when the tubes are supplied with a cooling fluid, the ends of the anvils will be chilled for immediate disengagement and clean release from the headed-over portion of the respective shanks.

5 Claims, 2 Drawing Sheets

STAKING APPARATUS

TECHNICAL FIELD

This invention relates to an apparatus for joining components together by heat staking.

BACKGROUND ART

The process of heat staking is a known technique for securing articles in assembled relation. It has found widespread application for joining together plastic molded articles, and also in joining plastic molded articles to a metal article. Broadly, the process has used a formable projection on one article that is brought into registration with an aperture formed in another article to form the assembly. The projection is generally heat softened and staked into a headed shape by action of a forming staking anvil.

In the process of assembling devices, such as computer keyboards and similar items, plastic parts are often locked in place against a metal pan. The pan is apertured to receive a heat formable shank having a portion thereof projecting through the aperture to be melted over to trap the plastic portion against the pan. Conventional heat staking is often done by bringing a heated metal plate in contact with the protruding portion and melting it to form a flanged head extending radially beyond the margin defining the pan aperture. While this appears to be a simple operation, one soon encounters at least two problems. First, some plastics, notably acetol plastics, become gummy and stick to the staking head. Secondly, as the staking head is retracted, it is not unusual for the plastic posts or shanks to still be in the melted state. If not immediately released, the shank will be stretched thereby contracting its diameter and cause the adjoining components of the assembly to be loose with respect to the metal pan. This situation can also occur when a heat staking process is used for joining components to non-metal printed circuit boards or the like.

It is therefore a general object of the present invention to provide a method and apparatus which meet a long standing need in the art of securing components together by means of heat staking.

Specifically, it is an object of this invention to present a method and apparatus which will provide secure connection between adjoining, engaged components and to minimize the possibility of heat deformable plastic post or fastening shank, from sticking to a tool, such as a staking anvil, upon release of the staking anvil from the formed projection or shank.

It is a further object of the present invention to provide a heat staking method and device for joining a first component to a second component, wherein the second component includes a post or shank of heat deformable material having a portion protruding through an aperture in the first component, and further wherein the heat deformable portion will be permitted to tightly secure the components together with minimal shrinkage or contraction of the diameter of the projection or shank portion residing within the aperture.

Another specific object of the present invention is to present a method and apparatus for joining a first and second component together to form a secured assembly, wherein one of the components includes a heat deformable post or shank having a portion thereof projecting through an aperture in the other component, and wherein the protruding portion is heat staked over the margin defining the aperture, and prior to release of a heated staking anvil, the anvil will be chilled to permit a clean withdrawal of the tool from the formed plastic, and thereby minimize the possibility of the plastic projection to be stretched by sticking to the staking head and thereby reduce its diameter within the aperture.

The following United States patents are of interest as background art to the present invention: U.S. Pat. Nos. 2,705,346; 4,633,559 and 4,767,298.

SUMMARY OF THE INVENTION

The present invention is directed to and has as its principal object a method of heat staking, and to an apparatus therefor, which allows components to be joined together to form a unitary assembly. This is accomplished by providing a method and apparatus for joining components together where a first component includes a post or shank projecting therefrom and having at least a portion of heat formable plastic material, and where the second component includes at least one opening or aperture through which the shank may be inserted and heat staked to form the unitary assembly, and wherein fixturing means are provided for retaining the first and second components in relative alignment with the deformable anvil portion protruding through the opening. Reciprocably movable support means are provided for supporting and retaining a staking head and for driving the staking head and at least one laterally projecting anvil toward and away from the protruding portion of the shank to deform the portion and thereby join together the first and second component. Means are further provided for heating the staking anvil or anvils to a predetermined temperature. There is further provided chilling means for cooling the staking anvil or anvils after deformation or heading of the protruding deformable shank portion to thereby permit rapid disengagement and clean release of the staking anvil from the deformed headed portion.

Specifically, the invention contemplates the use of at least one metal post or anvil having a series of axially spaced fins at its free or distal end protruding from the movable support means and wherein the support means and staking head includes means for heating the supported end of the anvil, and further wherein there is provided at least one hollow, air supply tube with holes drilled in the tube adjacent to the finned distal end of the anvil. After the heated end of the anvil has melted or heated over the protruding deformable portion of the shank, air or other cooling fluid is passed through the tube and out of the holes to cool the finned ends of the staking heads. With the plastic now solidified, the staking head and its anvil or anvils may be pulled away cleanly, leaving plastic parts to be held or clamped together tightly without causing the shank diameter to shrink or contract within the aperture or apertures of the second component. After the air flow is stopped by a control means, the anvil or anvils are permitted to re-heat to a preselected temperature and the process may begin again after a predetermined temperature has been reached.

DETAILED DESCRIPTION OF THE PREFERRED EMBODIMENT

Figure 1:
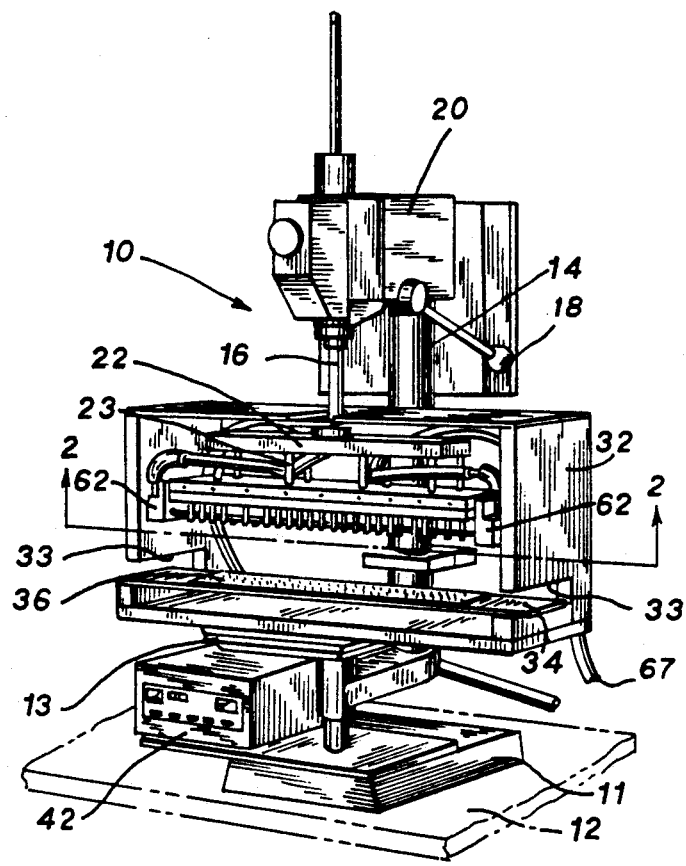
FIG. 1 is a perspective view of the improved heat staking apparatus of this invention, and containing the necessary fixturing for accomplishing the method of the present invention.

With reference to FIG. 1, there is illustrated a conventional heat staking apparatus or machine 10 supported by a base plate 11 arranged to rest on a workbench 12. A fixture supporting work table 13 is vertically adjustable to accommodate the height and/or working position of an operator. A columnar support 14 is provided and is equipped with vertical adjustment means (not shown) for vertically positioning a reciprocably movable secondary column 16. The column 16 is arranged for manual operation by means of a control lever 18 activating a conventional rack and gear mechanism (not specifically shown) located within a protective casing 20.

The lower end of the secondary column 16 engages and supports an elongated support member 22. Attached to the member 22 are a plurality of spacer elements 23, the lower ends of which engage and support an elongated staking head, indicated generally by the reference numeral 30.

Figure 4:
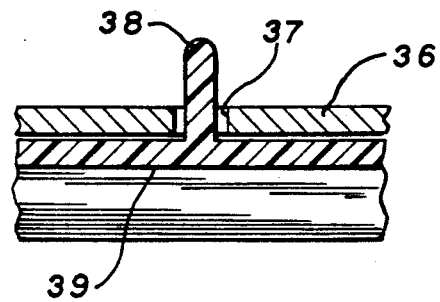
FIG. 4 is a fragmentary sectional view of two components to be joined as a unitary assembly and illustrating the arrangement of an apertured first component receiving a protruding heat deformable post or shank projecting from the second component.
Figure 5:
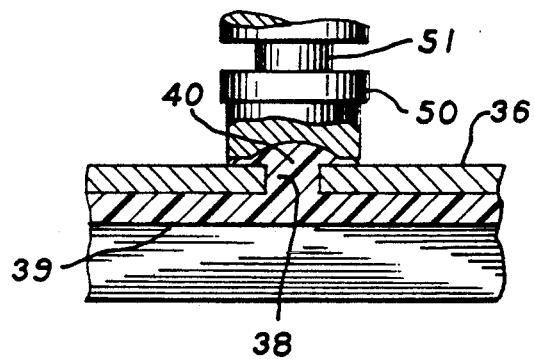
FIG. 5 is a fragmentary sectional view illustrating the formation of the headed, deformable post or shank, and during formation thereof with the heated anvil forming the headed shank portion for joining the components together.

The operating components of the improved apparatus are preferably disposed in a stationary, open-ended enclosure 32 having its front side open engaged for access by a machine operator. The enclosure 32 is slotted or grooved 33 at opposite sides for ease in access for insertion of a removable supporting auxiliary work table 34 arranged for support of flat components 36, 39 to be joined together (see details in FIG. 4). The flat, apertured pan 36 may be metallic and is conventional and may take the form of the inner support for a computer keyboard (not shown). As shown in the views of FIGS. 4 and 5, the pan 36 is apertured at 37 to receive an upstanding post or shank 38 preferably integrally formed with and projecting from a flat plastic, sheetlike component 39 to be fastened to the pan 36.

Although the components 36 and 39, and the shank or post 38, are preferably as shown herein, it is contemplated that the shank 38 may be an independent component which will be double-headed (not specifically disclosed) to be received in respective apertures formed in both of the fastened components 36 and 39 to comprise a unitary assembly of elements 36, 38 and 39. Also, the shank 38 may only have a protruding portion thereof (not shown) formed from a deformable plastic material capable of being headed over by the improved fixture, as will hereinafter be described. The arrangement shown in FIGS. 4 and 5 are shown for purposes of teaching the present invention, and illustrated only one embodiment with the shank 38 being integrally formed with the component 39 to extend through the opening 37 and having the distal portion 40 of the shank 38 headed over as shown in FIG. 5. The views of FIGS. 4 and 5 will hereinafter be described in greater detail.

Figure 2:
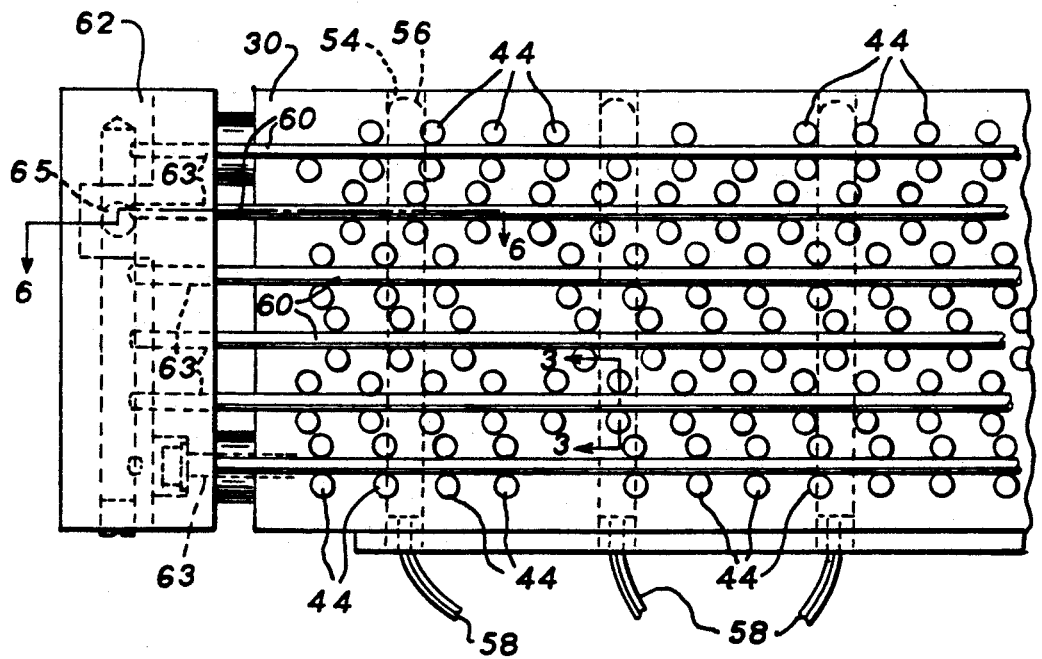
FIG. 2 is a partial sectional view, taken along line 2—2 of FIG. 1, and illustrating the underside of the improved staking head portion of the improved apparatus.
Figure 3:
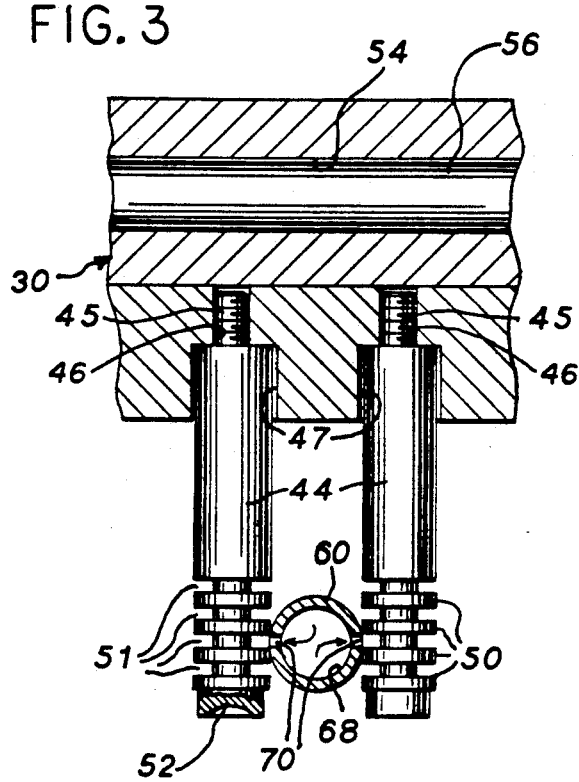
FIG. 3 is a partial sectional view taken along line 3—3 of FIG. 2, and specifically illustrating the arrangement of a cooling tube disposed adjacent to head forming anvils and further illustrating details of the finned anvils.
Figure 6:
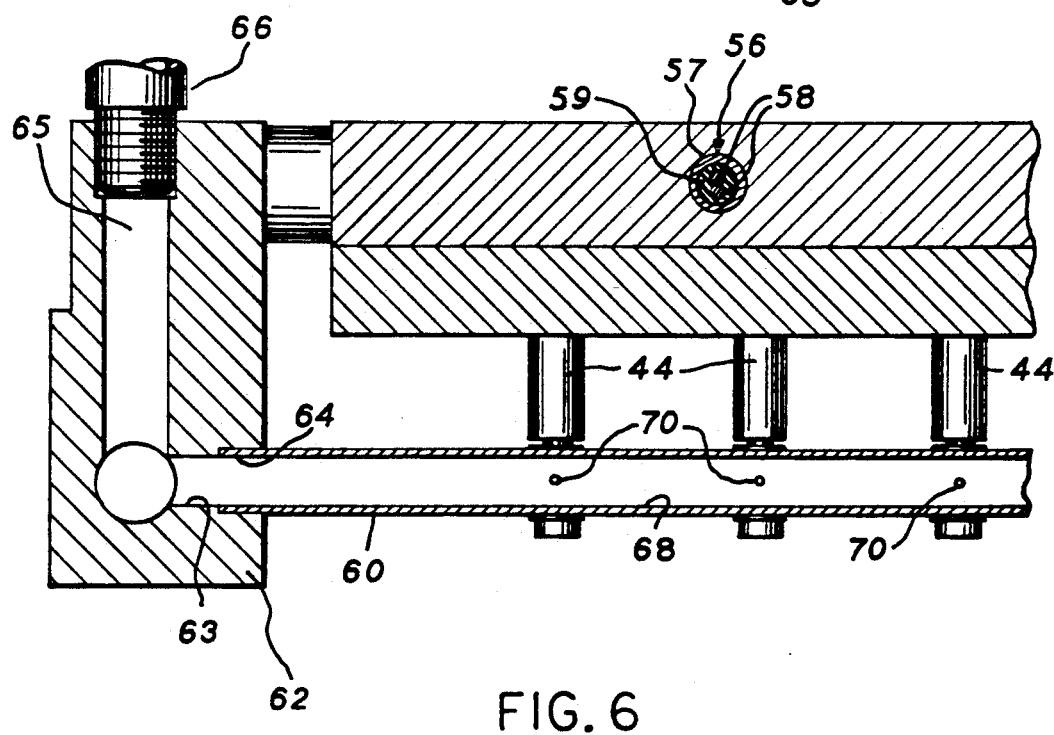
FIG. 6 is a partial sectional view taken along line 6—6 of FIG. 2.

With reference being had again to FIG. 1, and taken in connection with FIGS. 2, 3 and 6, it will be noted that the machine 10 is further provided with a control unit 42 containing various controls for supplying heat and cooling air, as needed, to accomplish the method of the present invention.

The staking head 30 includes a plurality of laterally extending anvils 44, which are laterally spaced relative to one another. The anvils 44 each have threaded ends 45 of reduced diameter (see FIG. 3) engaging threaded openings 46 in the staking head 30. The threaded openings 46 communicate with enlarged re-entrant bores 47 for receiving a portion of one end of each of the anvils 44 to provide desired conductive heat transfer from the heated staking head 30.

A free end portion of each anvil 44 is provided with a series of axially spaced, radially extending cooling fins 50 formed by undercutting the generally cylindrically shaped anvil 44 to provide series of axially spaced, reduced diameter portions 51. The distal end of each anvil 44 is machined, or otherwise formed with a heading surface 52. The surfaces 52 are preferably uniformly concave to provide the deformed, headed-over portion 40 of the shank 38. A desired convex headed portion 40 is shown at FIG. 5, although other configurations may be formed, as desired, without departing from this invention.

As stated hereinabove, the staking head 30 is provided with laterally spaced thru-bores 54, preferably coextensive with the width of the staking head 30, as shown in FIG. 2. The thru-bores 54 may also be drilled to a preferred depth, less than the width (not shown) to accommodate a heating element 56. The individual heating elements 56 are conventional and may be readily selected from commercial catalogs by specified length, diameter and wattage. The number of the heating elements and the spacing is decided in accordance with heating requirements for operating the staking operation. An exemplary heating element 56 is shown at FIG. 6 and includes an insulating tubular casing 57, which may be of ceramic material, and arranged to contain heating conductors 58. The conductors 58 are conventionally surrounded by an electrically insulating, fibrous material 59.

Thus, the staking head 30 may be heated, and this heat will be conducted to each of the staking anvils 44. The forming ends 52 of each anvil 44 is heated to a preselected temperature necessary for heading over the heat formable portion 40 of a respective shank 38.

The anvils 44, as shown in FIG. 2 protrude from the underside of the staking head 30, and are disposed in openings 46, 47 located in a preselected array determined by the designer of the workpiece, such as the metal pan underside of a computer keyboard. Preferably, the respective anvils 44 are located to provide a path (see FIG. 2) for receiving elongated hollow tubes 60, preferably coextensive of the length of the staking head 30. Each of the respective cooling tubes 60 are preferably formed of brass stock and are received and supported at opposite ends thereof by manifolds 62 (see FIGS. 2 and 6). A shouldered opening 63 is arranged with its enlarged portion at the inner side of the manifold 62 to communicate with an air supply bore 65 threaded at its upper end, with respect to FIG. 6, to receive a threaded fitting 66. The fitting 66 is arranged to receive an air or other fluid supply tube 67 (see FIG. 1), the other end of which communicates with an air pump (not shown). A conventional 80 gallon holding tank (not shown) is mounted to the fitting 66. A standard 7 horsepower or greater shop compressor (also not shown) maintains tank pressure at approximately 90 psi. The control housing enclosure 42 has variable timing devices for cyclical supply of air as desired.

Operation

A flat metal pan 36, which may be of the type used to back a computer keyboard, is positioned and supported by a removable temporary work table 34. The table 34 is inserted in the grooves or slots 33 of the enclosure 32, and is supported thereby. The staking head 30 is positioned as shown in FIG. 1 prior to manual, reciprocal operation thereof. The staking head 30 is preheated to a preselected temperature as determined by conventional adjustable potentiometers or other variable resistors (not shown) contained in the enclosure or control 42. After the desired temperature of the heat has been transmitted to the distal end portion 52 of the respective anvils 44, the machine operator may manually move the staking head 30 downwardly with its anvils 44 engaging the heat deformable end portion of each of the respective shanks 38 of the component 39 to soften the plastic and compress or stake it to form and head over the concave headed portion 40 as shown in FIG. 5.

As previously stated, this is a conventional operation, but can very often result in two serious problems. That is, certain plastics, such as acetols, become gummy and stick to the respective anvils 44. In the past, a conventional heat staking apparatus permitted the staking head and its anvils to retract with the "sticking" plastic stretching the softened shanks, which were still in the melted state. The shank diameter was accordingly reduced, thereby preventing the shank from entirely filling the aperture 37 of the component 36. As will be apparent, a good tight fit is required to maintain clamping engagement of the joined components 36 and 39 and prevent lateral shifting therebetween.

To accomplish the primary objectives of this invention, the respective anvils have been provided with finned end portions 50, 51 to permit rapid cooling of the end portions of the respective anvils 44 and to insure, prior to removal of the forming anvil 44, that the headed-over portion 40 of each shank 38 will have been cooled sufficiently to permit rapid disengagement and clean release of the formed and forming elements. This rapid cooling is further assisted by spacing the cooling tubes 60 away from the heated staking head 30, to a position proximate to the distal finned ends of the anvils 44, and introducing air, as needed, and at a desired temperature (usually ambient) into the bores 63 and 65 of the manifolds 62 for entry into the respective bores 68 or the tubes 60. A series of apertures or holes 70 are supplied, and are preferably located adjacent the fins of respective anvil 44. More may be supplied, if found to be necessary.

In addition, it is preferred to provide a relatively "tight fit" between the cooling tubes 60 and their respective anvils 44 to permit heat via conduction to be transferred away, in addition to being convected away by the flowing air or other cooling fluid from each of the openings 70 in respective tubes 60. The lateral spacing of the anvils 44 is preferably selected to be a "press fit" to insure a heat conductive engagement with its tube 60. If additional tubes are needed, they may be readily supplied and may be, if desired, located at the diametrically opposed sides of a row of anvils 44 (not shown).

The invention has been described in connection with a preferred embodiment, and the description provided herein is not intended to be limiting, but instead, illustrative of a manner in which the invention may be practiced. Alternative embodiments have been suggested above, and others will suggest themselves to those skilled in the art without departing from the scope of the following claims.

I claim:

1. An apparatus for joining components together by heat staking where a first component includes a shank, and a second component includes an aperture adapted to receive the shank with at least a protruding end portion of the shank being of heat deformable material arranged to be heat staked to secure the first component to the second component to form a unitary assembly, said apparatus comprising:
    a. means for fixturing said first and second components in relative alignment, with said shank protruding end portion being received by said aperture;
    b. a reciprocably moveable heat staking head including an elongated staking anvil projecting laterally therefrom, an end portion of the anvil being provided with a plurality of axially spaced undercut grooves to define a series of axially spaced heat transfer fins;
    c. means for heating said anvil to a predetermined temperature;
    d. drive means for reciprocably driving said moveable heat staking head and anvil toward and away from the protruding end portion of said shank to cause a distal end surface of said anvil to deform said protruding end portion and thereby join together said first and second component; and
    e. chilling means comprising a tubular member including apertures in the vicinity of the heat transfer fins of said anvil and arranged to transport a cooling fluid media for cooling said anvil after deformation of said protruding deformable shank end portion, thereby permitting rapid disengagement and clean release of said anvil from said deformed end portion.

2. The apparatus of claim 1, wherein said first component includes a plurality of shanks laterally spaced from one another in a preselected array and wherein apertures of said second component are spaced from one another and are arranged to receive respective ones of said shanks, and further wherein said heat staking head includes a plurality of said anvils for respectively heat deforming individual shank end portions protruding through the apertures to head over the end portions and clampingly engage the components together to form a unitary assembly.

3. The apparatus of claim 2 wherein the anvils are each configured at their respective distal end surface with concave heading surfaces for deforming respective heat deformable shank end portions with a convex shaped head overlying the margins defining the second component apertures.

4. The apparatus of claim 1, wherein a series of anvils are arranged in at least one set of parallel rows and are in touching contact with a respective tubular member for conductive heat transfer purposes.

5. The apparatus of claim 1, wherein the heating means comprises at least one bore in said staking head and an elongated electrical heater unit being received by said bore, ad insulating material disposed in said bore between said heater unit and said bore to provide electrical insulation therebetween, a source of electrical current for said heater unit, said staking head arranged to conduct heat from said heater unit to the anvil, and control means for maintaining said predetermined anvil temperature.

* * * * *